US010432934B2

(12) United States Patent
Aoki et al.

(10) Patent No.: US 10,432,934 B2
(45) Date of Patent: Oct. 1, 2019

(54) VIDEO ENCODING DEVICE AND VIDEO DECODING DEVICE

(75) Inventors: Hirofumi Aoki, Tokyo (JP); Keiichi Chono, Tokyo (JP); Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 643 days.

(21) Appl. No.: 14/009,659

(22) PCT Filed: Jun. 8, 2012

(86) PCT No.: PCT/JP2012/003759
§ 371 (c)(1),
(2), (4) Date: Oct. 29, 2013

(87) PCT Pub. No.: WO2013/001729
PCT Pub. Date: Jan. 3, 2013

(65) Prior Publication Data
US 2014/0056349 A1    Feb. 27, 2014

(30) Foreign Application Priority Data

Jun. 28, 2011   (JP) ................................ 2011-143249

(51) Int. Cl.
*H04N 19/124*  (2014.01)
*H04N 19/50*   (2014.01)
*H04N 19/59*   (2014.01)

(52) U.S. Cl.
CPC .......... *H04N 19/124* (2014.11); *H04N 19/50* (2014.11); *H04N 19/59* (2014.11)

(58) Field of Classification Search
CPC ........................ H04N 19/00569; H04N 7/32

USPC ..................................................... 375/240.12
See application file for complete search history.

(56) References Cited

U.S. PATENT DOCUMENTS

| 5,526,052 A * | 6/1996 | Ar | H04N 19/503 |
| | | | 375/240.03 |
| 5,870,145 A * | 2/1999 | Yada | H04N 19/149 |
| | | | 375/240.04 |
| 2003/0067980 A1* | 4/2003 | Shen | H04N 19/176 |
| | | | 375/240.03 |
| 2005/0261893 A1* | 11/2005 | Toyama | G10L 19/02 |
| | | | 704/201 |

(Continued)

FOREIGN PATENT DOCUMENTS

| CN | 101779467 A | 7/2010 |
| CN | 101785318 A | 7/2010 |

(Continued)

OTHER PUBLICATIONS

ISO/IEC 14496-10 Advanced Video Coding (2009).

(Continued)

*Primary Examiner* — Richard A Hansell, Jr.
(74) *Attorney, Agent, or Firm* — Finnegan, Henderson, Farabow, Garrett & Dunner, L.L.P.

(57) ABSTRACT

A video encoding device includes: a quantization step size encoding unit 11 for encoding a quantization step size for controlling quantization granularity; and a quantization step size downsampling unit 12 for downsampling one or more encoded quantization step sizes to generate a quantization step size representative value. The quantization step size encoding unit 11 predicts the quantization step size using the quantization step size representative value.

15 Claims, 14 Drawing Sheets

(56) References Cited

U.S. PATENT DOCUMENTS

| | | | |
|---|---|---|---|
| 2007/0071335 A1* | 3/2007 | Thyagarajan | H04N 19/147 382/239 |
| 2007/0122047 A1* | 5/2007 | Tsuru | H04N 19/172 382/251 |
| 2007/0217506 A1* | 9/2007 | Yang | H04N 19/147 375/240.03 |
| 2009/0310682 A1* | 12/2009 | Chono | H04N 19/139 375/240.16 |
| 2011/0002385 A1* | 1/2011 | Kobayashi | H04N 19/176 375/240.13 |
| 2011/0019737 A1 | 1/2011 | Yang et al. | |
| 2011/0150077 A1* | 6/2011 | Kishore | H04N 19/176 375/240.03 |
| 2011/0255594 A1* | 10/2011 | Nagori | H04N 19/196 375/240.03 |
| 2011/0268180 A1* | 11/2011 | Srinivasamurthy | H04N 19/176 375/240.03 |
| 2012/0140815 A1* | 6/2012 | Zhou | H04N 19/117 375/240.03 |

FOREIGN PATENT DOCUMENTS

| | | |
|---|---|---|
| JP | 2646921 | 8/1997 |
| JP | 2007-184871 | 7/2007 |
| JP | 4529919 | 8/2010 |
| JP | 4613909 | 1/2011 |
| WO | WO 2008/126135 | 10/2008 |
| WO | WO 2009/105732 A1 | 8/2009 |
| WO | WO 2009/158113 A2 | 12/2009 |
| WO | WO 2012/178053 A1 | 12/2012 |
| WO | WO 2012178053 A1 * 12/2012 | ........... H04N 19/105 |

OTHER PUBLICATIONS

International Search Report and Written Opinion of ISA.
Chinese Office Action dated Apr. 13, 2016, by the Chinese Patent Office in counterpart Chinese Patent Application No. 2012800244486.
M. Coban et al., "Temporal QP Memory Compression", Joint Collaborative Team on Video Coding (JCT-VC) of ITU-T SG16 WP3 and ISO/IEC JTC1/SC29/WG11, 6$^{th}$ Meeting, JCTVC-F499, Jul. 2011.
M. Zhou et al., "Compact representation of quantization matrices for HEVC", Joint Collaborative Team on Video Coding (JCT-VC) of ITU-T SG16 WP3 and ISO/IEC JTC1/SC29/WG11, 4$^{th}$ Meeting, JCTVC-D024, WG11 No. m18763, Jan. 2011.

* cited by examiner

| seq_parameter_set_data() { | C | Descriptor |
|---|---|---|
| ... | | |
| temporal_qp_buffer_decimation_depth | 2 | ue(v) |
| ... | | |
| } | | |

VIDEO ENCODING DEVICE AND VIDEO DECODING DEVICE

CROSS-REFERENCE TO RELATED PATENT APPLICATIONS

This application is a National Stage Entry of International Application No. PCT/JP2012/003759, filed Jun. 8, 2012, which claims priority from Japanese Patent Application No. 2011-143249, filed Jun. 28, 2011. The entire contents of the above-referenced applications are expressly incorporated herein by reference.

TECHNICAL FIELD

The present invention relates to a video encoding technique, and in particular relates to a video encoding technique of performing prediction with reference to a reconstructed image and data compression by quantization.

BACKGROUND ART

A typical video encoding device performs an encoding process compliant with a predetermined video coding scheme on each frame of an input video, to generate coded data, i.e. a bitstream. ISO/IEC 14496-10 Advanced Video Coding (AVC) described in Non Patent Literature (NPL) 1, which is a representative example of the predetermined video coding scheme, divides each frame into blocks of 16×16 pixel size called macroblocks (MBs), and further divides each MB into blocks of 4×4 pixel size, where MB is the minimum unit of encoding. FIG. 17 shows an example of block division in the case where the color format of a frame is the YCbCr 4:2:0 format and the spatial resolution is QCIF (Quarter Common Intermediate Format).

Each of the image blocks obtained by the division is sequentially input to a video encoding device and encoded. FIG. 18 is a block diagram showing an example of a structure of a typical video encoding device for generating an AVC-compliant bitstream. The following describes the structure and operation of the typical video encoding device, with reference to FIG. 18.

The video encoding device shown in FIG. 18 includes a frequency transformer 101, a quantizer 102, a variable length encoder 103, a quantization controller 104, an inverse quantizer 105, an inverse frequency transformer 106, a frame memory 107, an intra-frame predictor 108, an inter-frame predictor 109, a prediction selector 110, and a bitstream buffer 111.

A predicted image supplied from the intra-frame predictor 108 or the inter-frame predictor 109 via the prediction selector 110 is subtracted from an image input to the video encoding device, and the result is input to the frequency transformer 101 as a prediction error image.

The frequency transformer 101 transforms the input prediction error image from a spatial domain to a frequency domain, and outputs the result as a coefficient image.

The quantizer 102 quantizes the coefficient image supplied from the frequency transformer 101 using a quantization step size, supplied from the quantization controller 104, for controlling quantization granularity, and outputs the result as a quantized coefficient image.

The variable length encoder 103 entropy-encodes the quantized coefficient image supplied from the quantizer 102. The variable length encoder 103 also encodes the quantization step size supplied from the quantization controller 104 and an image prediction parameter supplied from the prediction selector 110. These coded data are multiplexed and stored in the bitstream buffer 111 as a bitstream.

The bitstream buffer 111 stores the bitstream supplied from the variable length encoder 103, and outputs the bitstream as the output of the video encoding device at a predetermined transmission rate. The processing rate in the video encoding device and the transmission rate of the bitstream output from the video encoding device are adjusted by the bitstream buffer 111.

The quantization step size encoding process in the variable length encoder 103 is described below, with reference to FIG. 19. As shown in FIG. 19, a quantization step size encoder for encoding the quantization step size in the variable length encoder 103 includes a quantization step size buffer 10311 and an entropy encoder 10312.

The quantization step size buffer 10311 holds a quantization step size $Q(i-1)$ assigned to an immediately previously encoded image block.

The immediately previous quantization step size $Q(i-1)$ supplied from the quantization step size buffer 10311 is subtracted from an input quantization step size $Q(i)$ as shown in the following equation (1), and the result is input to the entropy encoder 10312 as a differential quantization step size $dQ(i)$.

$$dQ(i)=Q(i)-Q(i-1) \qquad (1).$$

The entropy encoder 10312 entropy-encodes the input differential quantization step size $dQ(i)$, and outputs the result as a code corresponding to the quantization step size.

This completes the description of the quantization step size encoding process.

The quantization controller 104 determines a quantization step size for the current input image block. Typically, the quantization controller 104 monitors the amount of output code of the variable length encoder 103, and increases the quantization step size so as to reduce the amount of output code for the image block or decreases the quantization step size so as to increase the amount of output code for the image block. The quantization step size is increased or decreased to enable the video encoding device to encode an input moving image with a desired amount of code. The determined quantization step size is supplied to the quantizer 102 and the variable length encoder 103.

The quantized coefficient image output from the quantizer 102 is inverse-quantized by the inverse quantizer 105 to a coefficient image, to be used for prediction in subsequent image block encoding. The coefficient image output from the inverse quantizer 105 is transformed back to the spatial domain by the inverse frequency transformer 106, as the prediction error image. The predicted image is added to the prediction error image, and the result is input to the frame memory 107 and the intra-frame predictor 108 as a reconstructed image.

The frame memory 107 stores reconstructed images of previously input and encoded image frames. The image frames stored in the frame memory 107 are referred to as "reference frames".

The intra-frame predictor 103 generates a predicted image, by referencing to a reconstructed image of a previously encoded image block in the image frame being currently encoded.

The inter-frame predictor 109 generates a predicted image, by referencing to a reference frame supplied from the frame memory 107.

The prediction selector 110 compares the predicted image supplied from the intra-frame predictor 108 and the predicted image supplied from the inter-frame predictor 109, and selects and outputs the predicted image closer to the input image. The prediction selector 110 also outputs information (referred to as "image prediction parameter") about the method of prediction employed by the intra-frame predictor 108 or the inter-frame predictor 109, to supply it to the variable length encoder 103.

The typical video encoding device compression-encodes the input moving image to generate a bitstream, by the above-mentioned process.

The output bitstream is transmitted to a video decoding device. The video decoding device performs a decoding process on the bitstream, to restore a moving image. FIG. 20 shows an example of a structure of a typical video decoding device for decoding the bitstream output from the typical video encoding device to obtain the decoded video. The following describes the structure and operation of the typical video decoding device, with reference to FIG. 20.

The video decoding device shown in FIG. 20 includes a variable length decoder 201, an inverse quantizer 202, an inverse frequency transformer 203, a frame memory 204, an intra-frame predictor 205, an inter-frame predictor 206, a prediction selector 207, and a bitstream buffer 2083.

The bitstream buffer 208 stores the input bitstream, and then outputs the bitstream to the variable length decode 201. The transmission rate of the bitstream input to the video decoding device and the processing rate in the video decoding device are adjusted by the bitstream buffer 208.

The variable length decoder 201 variable-length-decodes the bitstream input from the bitstream buffer 208, to obtain a quantization step size for controlling quantization granularity, a quantized coefficient image, and an image prediction parameter. The quantization step size and the quantized coefficient image are supplied to the inverse quantizer 202. The image prediction parameter is supplied to the prediction selector 207.

The inverse quantizer 202 inverse-quantizes the input quantized coefficient image based on the input quantization step size, and outputs the result as a coefficient image.

The inverse frequency transformer 203 transforms the coefficient image supplied from the inverse quantizer 202 from the frequency domain to the spatial domain, and outputs the result as a prediction error image. The predicted image supplied from the prediction selector 207 is added to the prediction error image, to generate a decoded image. The decoded image is output from the video decoding device as the output image, and also input to the frame memory 204 and the intra-frame predictor 205.

The frame memory 204 stores previously decoded image frames. The image frames stored in the frame memory 204 are referred to as "reference frames".

The intra-frame predictor 205 generates a predicted image by referencing to, based on the image prediction parameter supplied from the variable length decoder 201, a reconstructed image of a previously decoded image block in the image frame being currently decoded.

The inter-frame predictor 206 generates a predicted image by referencing to, based on the image prediction parameter supplied from the variable length decoder 201, a reference frame supplied from the frame memory 204.

The prediction selector 207 selects the predicted image supplied from the intra-frame predictor 205 or the predicted image supplied from the inter-frame predictor 206, based on the image prediction parameter supplied from the variable length decoder 201.

The quantization step size decoding process in the variable length decoder 201 is described below, with reference to FIG. 21. As shown in FIG. 21, a quantization step size decoder for decoding the quantization step size in the variable length decoder 201 includes an entropy decoder 20111 and a quantization step size buffer 20112.

The entropy decoder 20111 entropy-decodes the input code, and outputs a differential quantization step size dQ(i).

The quantization step size buffer 20112 holds the immediately previous quantization step size Q(i−1).

Q(i−1) supplied from the quantization step size buffer 20112 is added to the differential quantization step size dQ(i) generated by the entropy decoder 20111, as shown in the following equation (2). The sum is output as a quantization step size Q(i), and also input to the quantization step size buffer 20112.

$$Q(i)=Q(i-1)+dQ(i) \qquad (2).$$

This completes the description of the quantization step size decoding process.

The typical video decoding device decodes the input bitstream to generate the moving image, by the above-mentioned process.

Typically, the quantization controller 104 in the typical video encoding device not only analyzes the amount of output code but also analyzes one or both of the input image and the prediction error image to determine the quantization step size according to human visual sensitivity, in order to maintain the subjective quality of the moving image compressed by the encoding process. That is, the quantization controller 104 performs visual-sensitivity-adaptive quantization. In detail, the quantization controller 104 sets a small quantization step size in the case where the human visual sensitivity to the current image to be encoded is determined to be high, and sets a large quantization step size in the case where the human visual sensitivity is determined to be low. Such control allows a larger amount of code to be assigned to an area that is high in visual sensitivity, thus improving the subjective image quality.

An example of a known visual-sensitivity-adaptive quantization technique is adaptive quantization based on texture complexity of an input image, which is employed in Test Model 5 (TM5) of MPEG-2 The texture complexity is commonly called "activity". Patent Literature (PTL) 1 proposes an adaptive quantization method in which the activity of the predicted image is used in addition to the activity of the input image. PTL 2 proposes an adaptive quantization method based on activity that takes an edge part into account.

When using the visual-sensitivity-adaptive quantization technique, there is a problem that the quantization step size frequently varies within an image frame. The typical video encoding device for generating the AVC-compliant bitstream, upon encoding the quantization step size, entropy-encodes the difference from the quantization step size for the immediately previously encoded image block. Accordingly, if the variation of the quantization step size in the encoding order direction is large, the amount of code necessary to encode the quantization step size increases. This causes an increase in bitstream size, and an increase in memory size required to implement the bitstream buffer.

Since the encoding order direction is not related to the continuity of the visual sensitivity on the screen, the visual-sensitivity-adaptive quantization technique inevitably increases the amount of code necessary to encode the quantization step size. Therefore, the typical video encoding device has a problem that an increase in bitstream size and an increase in required memory size are inevitable in the case of using the visual-sensitivity-adaptive quantization technique in order to improve the subjective image quality.

In view of this problem, PTL 3 discloses a technique in which a dead zone, i.e. a range for quantizing to zero, is adaptively set according to visual sensitivity in the spatial domain and the frequency domain, instead of adaptively setting the quantization step size according to visual sensitivity. In the method described in PTL 3, a dead zone for a transform coefficient determined to be low in visual sensitivity is set larger than a dead zone for a transform coefficient determined to be high in visual sensitivity. Such control enables visual-sensitivity-adaptive quantization to be carried out without varying the quantization step size.

CITATION LIST

Patent Literatures

PTL 1: Japanese Patent No. 2646921
PTL 2: Japanese Patent No. 4529919
PTL 3: Japanese Patent No. 4613909

Non Patent Literature

NPL 1: ISO/IEC 14496-10 Advanced Video Coding

SUMMARY OF INVENTION

Technical Problem

With the technique described in PTL 3, however, it is impossible to perform visual-sensitivity-adaptive quantization for transform coefficients not within the dead zone range. That is, the amount of coefficient code cannot be reduced for transform coefficients not within the dead zone range, even when determined to be low in visual sensitivity. Besides, while quantized transform coefficient values are concentrated around zero in the case of increasing the quantization step size, transform coefficients not within the dead zone range, when quantized, are not concentrated around zero in the case of increasing the dead zone. In other words, the coding efficiency by entropy coding is insufficient in the case of increasing the dead zone, as compared with the case of increasing the quantization step size. For these reasons, the typical coding technique has a problem that visual-sensitivity-adaptive quantization causes an increase in required memory size in the video encoding device and the video decoding device.

The present invention has been made in view of the problems stated above. A first object of the present invention is to provide an video encoding device capable of encoding a moving image with high image quality without an increase in required memory size, by enabling a quantization step size to be frequently varied while preventing an increase in amount of code. A second object of the present invention is to provide an video decoding device capable of reproducing a moving image with high image quality without an increase in required memory size.

Solution to Problem

A video encoding device according to the present invention is a video encoding device for dividing input video data into blocks of a predetermined size and applying quantization to each image block obtained by division, to perform a compression encoding process, the video encoding device including: quantization step size encoding means for encoding a quantization step size for controlling granularity of the quantization; and quantization step size downsampling means for downsampling one or more encoded quantization step sizes to generate a quantization step size representative value, wherein the quantization step size encoding means predicts the quantization step size using the quantization step size representative value.

A video decoding device according to the present invention is an video decoding device for decoding image blocks by applying inverse quantization to input compressed video data, to perform a generation process of video data as a set of the image blocks, the video decoding device including: quantization step size decoding means for decoding a quantization step size for controlling granularity of the inverse quantization; and quantization step size downsampling means for downsampling one or more decoded quantization step sizes to generate a quantization step size representative value, wherein the quantization step size decoding means predicts the quantization step size using the quantization step size representative value.

Advantageous Effects of Invention

According to the present invention, in the video encoding device, even when the quantization step size is frequently varied within an image frame, the associated increase in amount of generated code can be prevented. In other words, the quantization step size can be encoded with a smaller amount of code. This solves the problem that the required memory size increases for subjective image quality improvement by visual-sensitivity-adaptive quantization. Moreover, according to the present invention, in the video decoding device, only a small amount of code needs to be received to decode the frequently varying quantization step size. Hence, a moving image with high image quality can be reproduced with a small required memory size.

DESCRIPTION OF EMBODIMENTS

The following describes exemplary embodiments of the present invention with reference to drawings.

Exemplary Embodiment 1

Figure 18:
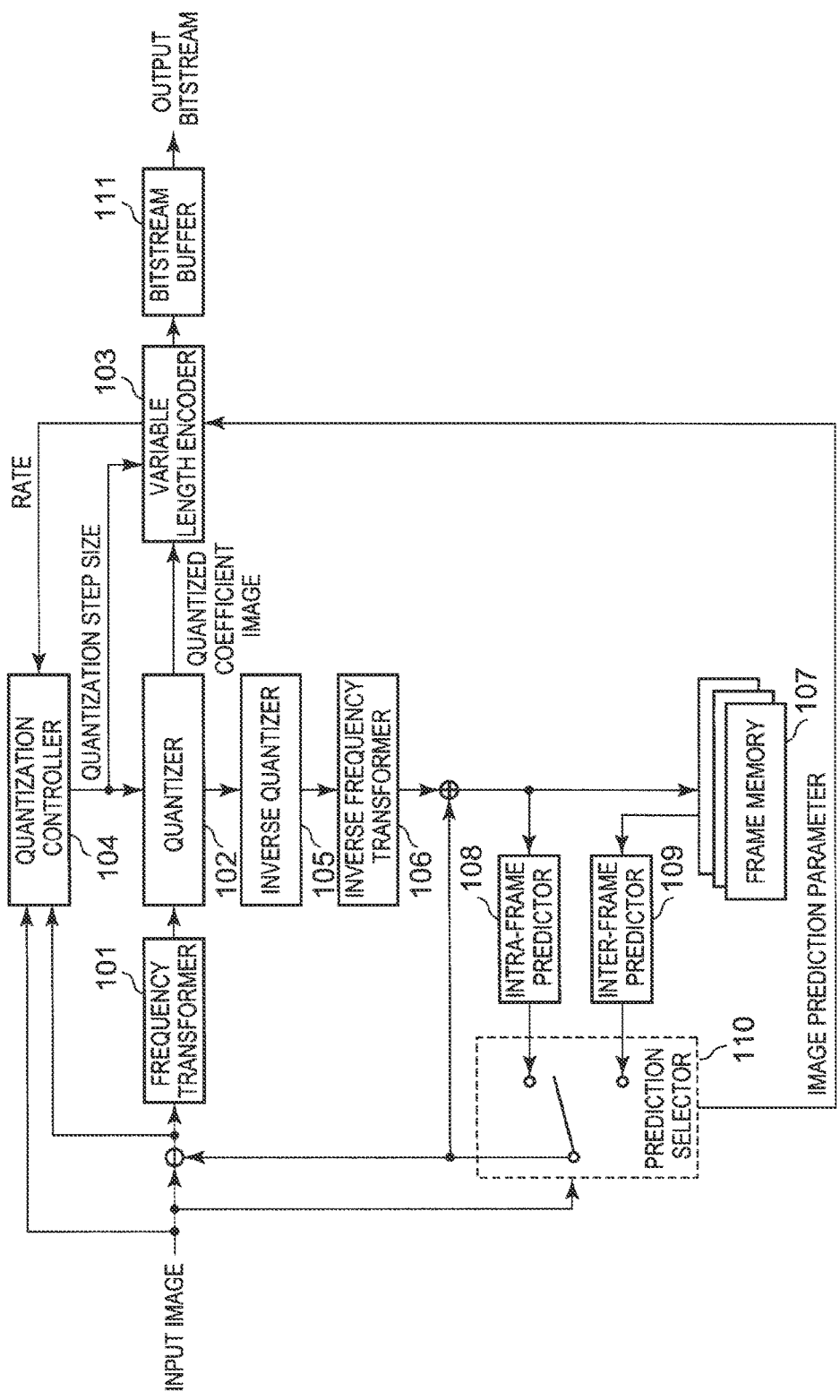
FIG. 18 is a block diagram showing an example of a structure of a video encoding device.
Figure 19:
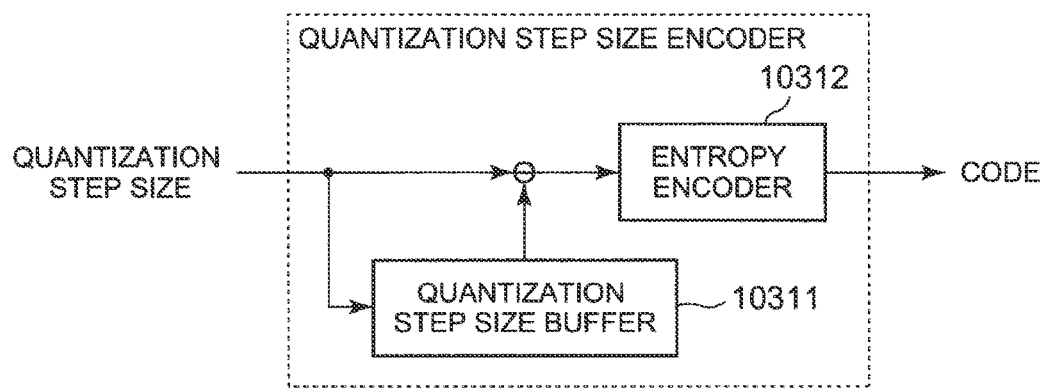
FIG. 19 is a block diagram showing a quantization step size encoder in a typical video encoding device.

A video encoding device in Exemplary Embodiment 1 of the present invention includes the frequency transformer 101, the quantizer 102, the variable length encoder 103, the quantization controller 104, the inverse quantizer 105, the inverse frequency transformer 106, the frame memory 107, the intra-frame predictor 108, the inter-frame predictor 109, the prediction selector 110, and the bitstream buffer 111, like the typical video encoding device shown in FIG. 18. The quantization step size encoder included in the variable length encoder 103 has, however, a structure different from the structure shown in FIG. 19.

Figure 1:
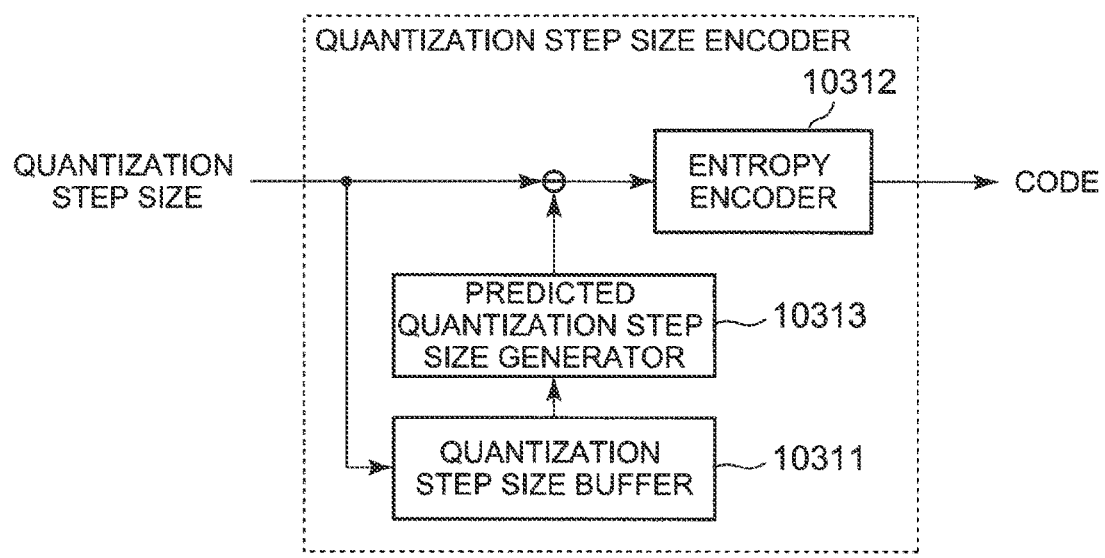
FIG. 1 is a block diagram showing a quantization step size encoder in a video encoding device in Exemplary Embodiment 1 of the present invention.

FIG. 1 is a block diagram showing a structure of a quantization step size encoder in the video encoding device in Exemplary Embodiment 1 of the present invention. As shown in FIG. 1, the quantization step size encoder in this exemplary embodiment differs from the quantization step size encoder shown in FIG. 19 in that a predicted quantization step size generator 10313 is included.

The quantization step size buffer 10311 stores and holds quantization step sizes assigned to previously encoded image blocks.

The predicted quantization step size generator 10313 retrieves quantization step sizes assigned to previously encoded neighboring image blocks from the quantization step size buffer, and generates a predicted quantization step size.

The predicted quantization step size supplied from the predicted quantization step size generator 10313 is subtracted from an input quantization step size, and the result is input to the entropy encoder 10312 as a differential quantization step size.

The entropy encoder 10312 entropy-encodes the input differential quantization step size, and outputs the result as a code corresponding to the quantization step size.

With this structure, it is possible to reduce the amount of code necessary to encode the quantization step size. As a result, the increase in required memory size associated with the variation of the quantization step size can be prevented. This is because the absolute quantity of the differential quantization step size input to the entropy encoder 10312 can be reduced by the predicted quantization step size generator 10313 generating the predicted quantization step size using the quantization step sizes of the neighboring image blocks not dependent on the encoding order. The reason why the absolute quantity of the differential quantization step size input to the entropy encoder 10312 can be reduced by generating the predicted quantization step size using the quantization step sizes of the neighboring image blocks is that, since there is usually a correlation between neighboring pixels in a moving image, highly correlated neighboring image blocks are assigned quantization step sizes of high similarity in the case of using visual-sensitivity-adaptive quantization.

The following describes a detailed operation of the above-mentioned quantization step size encoder in the video encoding device in Exemplary Embodiment 1, using a specific example.

In this example, it is assumed that image blocks as encoding units are fixed in size. The neighboring image blocks used for quantization step size prediction are three image blocks that are left adjacent, upper adjacent, and upper right adjacent in the same image frame.

Figure 2:
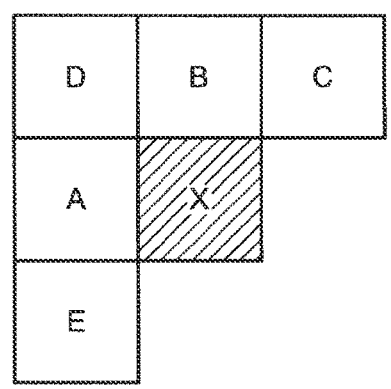
FIG. 2 is an explanatory diagram showing an example of positional relations between an image block to be encoded and neighboring image blocks.

Suppose the current image block to be encoded is X, and three neighboring image blocks A, B, and C are respectively positioned left adjacent, upper adjacent, and upper right adjacent to the image block X, as shown in FIG. 2. When a quantization step size in an arbitrary block Z is denoted by Q(Z) and a predicted quantization step size by pQ(Z), the predicted quantization step size generator 10313 computes a predicted quantization step size pQ(X) by the following equation (3).

$$pQ(X)=\mathrm{Median}(Q(A),Q(B),Q(C)) \quad (3)$$

Here, Median(x, y, z) is a function that finds a median value from three values x, y, and z.

The entropy encoder 10312 encodes a differential quantization step size dQ(X) obtained by the following equation (4), using signed Exp-Golomb (Exponential-Golomb) coding which is one type of entropy coding. The entropy encoder 10312 outputs the result as a code corresponding to the quantization step size for the image block.

$$dQ(X)=Q(X)-pQ(X) \quad (4).$$

Though three image blocks that are left adjacent, upper adjacent, and upper right adjacent in the same image frame are used as the neighboring image blocks used for quantization step size prediction in this example, the neighboring image blocks are not limited to such. For instance, image blocks that are left adjacent, upper adjacent, and upper left adjacent may be used to compute the predicted quantization step size by the following equation (5).

$$pQ(X)=\mathrm{Median}(Q(A),Q(B),Q(D)) \quad (5).$$

Note that the number of image blocks used for prediction is not limited to three, and may be any number. Moreover, not a median value but a mean value or the like may be computed for prediction. In addition, the image blocks used for prediction do not necessarily need to be adjacent to the current image block to be encoded, and may be apart from the current image block to be encoded by a predetermined distance. Furthermore, the image blocks used for prediction are not limited to spatially neighboring image blocks, i.e. image blocks in the same image frame. The image blocks used for prediction may be temporally neighboring image blocks, i.e. image blocks in an already encoded image frame other than the current image frame, or any other neighboring image blocks.

Though the image block to be encoded and the image blocks used for prediction are assumed to have the same fixed size in this example, the present invention is not limited to the case where image blocks as an encoding unit are fixed in size. Image blocks as an encoding unit may be variable in size, that is, the image block to be encoded and the image blocks used for prediction may have different sizes.

Though the difference between the quantization step size of the image block to be encoded and the predicted quantization step size is encoded based on Exp-Golomb coding in this example, the present invention is not limited to the use of Exp-Golomb coding, and may encode the differential quantization step size based on other entropy coding. For instance, the differential quantization step size may be encoded based on Huffman coding, arithmetic coding, or the like.

This completes the description of the video encoding device in Exemplary Embodiment 1 of the present invention.

Exemplary Embodiment 2

Figure 20:
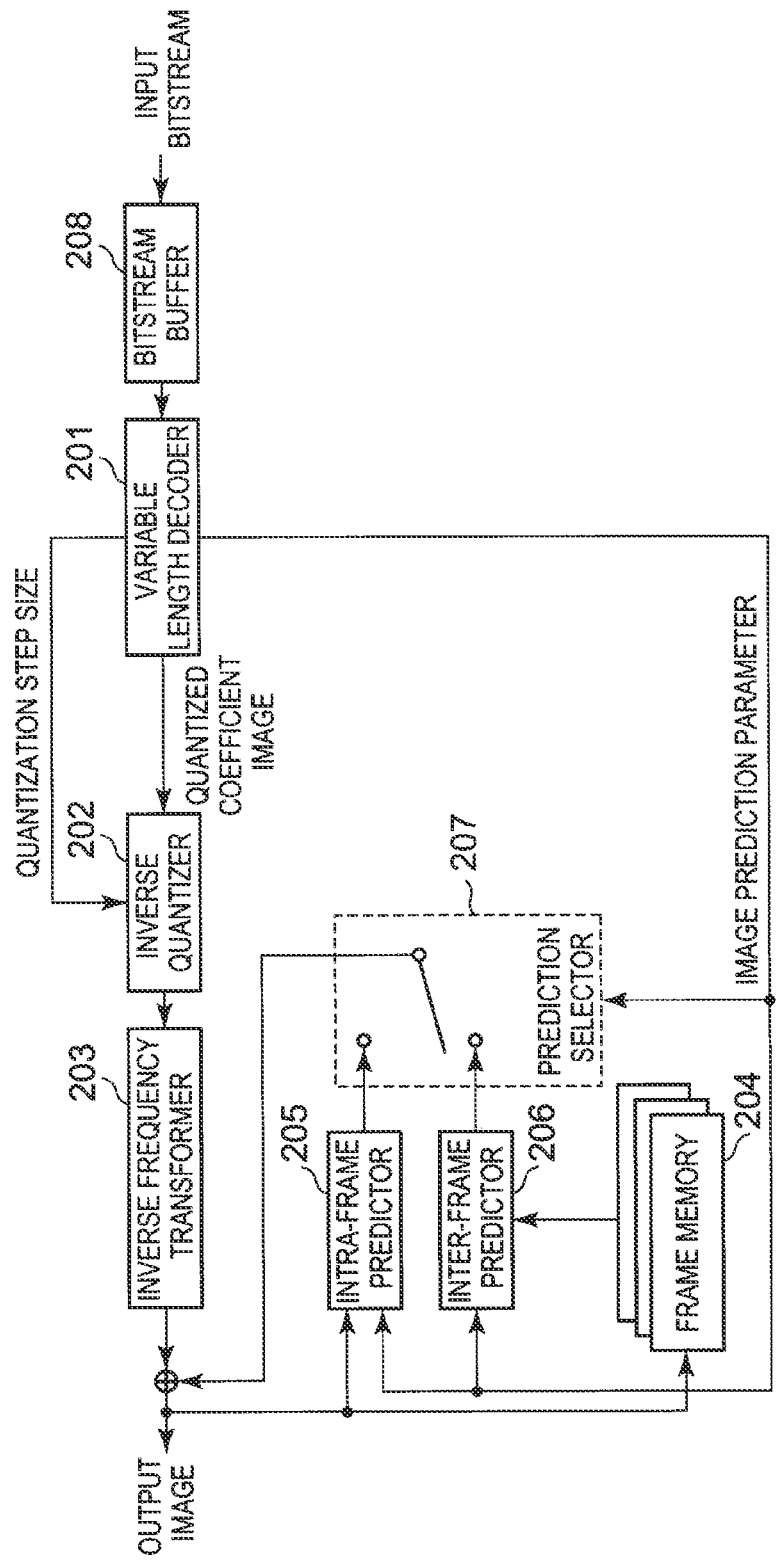
FIG. 20 is a block diagram showing an example of a structure of a video decoding device.
Figure 21:
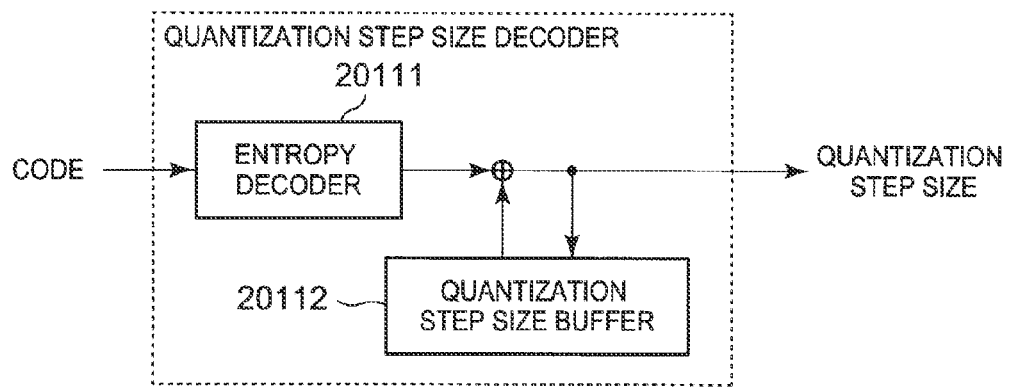
FIG. 21 is a block diagram showing a quantization step size decoder in a typical video decoding device.

A video decoding device in Exemplary Embodiment 2 of the present invention includes the variable length decoder 201, the inverse quantizer 202, the inverse frequency transformer 203, the frame memory 204, the intra-frame predictor 205, the inter-frame predictor 206, the prediction selector 207, and the bitstream buffer 208, like the typical video decoding device shown in FIG. 20. The quantization step size decoder included in the variable length decoder 201 has, however, a structure different from the structure shown in FIG. 21.

Figure 3:
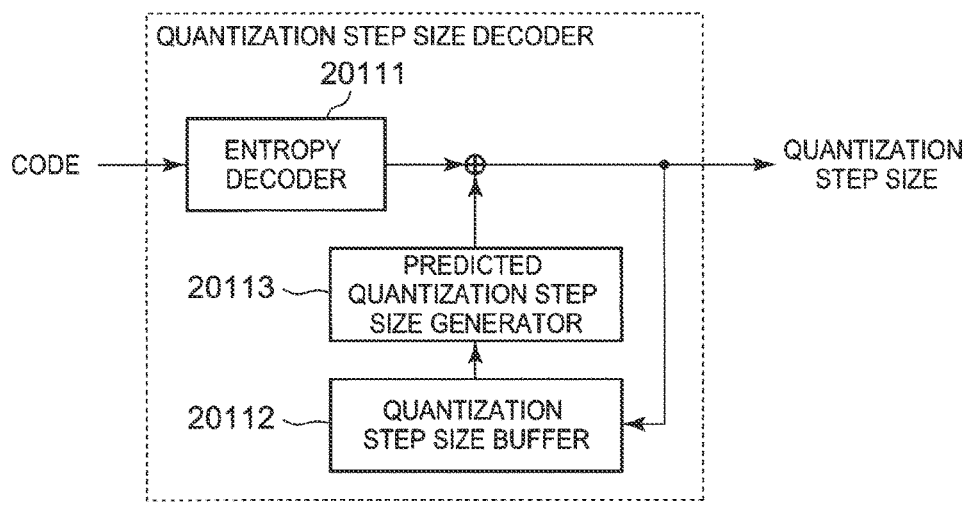
FIG. 3 is a block diagram showing a quantization step size decoder in a video decoding device in Exemplary Embodiment 2 of the present invention.

FIG. 3 is a block diagram showing a structure of a quantization step size decoder in the video decoding device in Exemplary Embodiment 2 of the present invention. As shown in FIG. 3, the quantization step size decoder in this exemplary embodiment differs from the quantization step size decoder shown in FIG. 21 in that a predicted quantization step size generator 20113 is included.

The entropy decoder 20111 entropy-decodes an input code, and outputs a differential quantization step size.

The quantization step size buffer 20112 stores and holds previously decoded quantization step sizes.

The predicted quantization step size generator 20113 retrieves quantization step sizes corresponding to neighboring pixel blocks of the current image block to be decoded from among the previously decoded quantization step sizes in the quantization step size buffer, and generates a predicted quantization step size. In detail, the predicted quantization step size generator 20113 performs, for example, the same operation as the predicted quantization step size generator 10313 in the specific example of the video encoding device in Exemplary Embodiment 1.

The predicted quantization step size supplied from the predicted quantization step size generator 20113 is added to the differential quantization step size generated by the entropy decoder 20111, and the result is output as a quantization step size and also input to the quantization step size buffer 20112.

With this structure of the quantization step size decoder, the video decoding device needs to receive only a smaller amount of code to decode the quantization step size. As a result, the increase in required memory size associated with the variation of the quantization step size can be prevented. This is because the predicted quantization step size closer to the actually assigned quantization step size can be obtained by the predicted quantization step size generator 20113 generating the predicted quantization step size using the quantization step sizes of the neighboring image blocks not dependent on the decoding order, and so the entropy decoder 20111 only needs to decode the differential quantization step size closer to zero. The reason why the predicted quantization step size closer to the actually assigned quantization step size can be obtained by generating the predicted quantization step size using the quantization step sizes of the neighboring image blocks is that, since there is usually a correlation between neighboring pixels in a moving image, highly correlated neighboring image blocks are assigned quantization step sizes of high similarity in the case of using visual-sensitivity-adaptive quantization.

This completes the description of the video decoding device in Exemplary Embodiment 2 of the present invention.

Exemplary Embodiment 3

A video encoding device in Exemplary Embodiment 3 of the present invention includes the frequency transformer 101, the quantizer 102, the variable length encoder 103, the quantization controller 104, the inverse quantizer 105, the inverse frequency transformer 106, the frame memory 107, the intra-frame predictor 108, the inter-frame predictor 109, the prediction selector 110, and the bitstream buffer 111 as shown in FIG. 18, like the video encoding device in Exemplary Embodiment 1 of the present invention. The quantization step size encoder included in the variable length encoder 103 has, however, a structure different from the structures shown in FIGS. 19 and 1.

Figure 4:
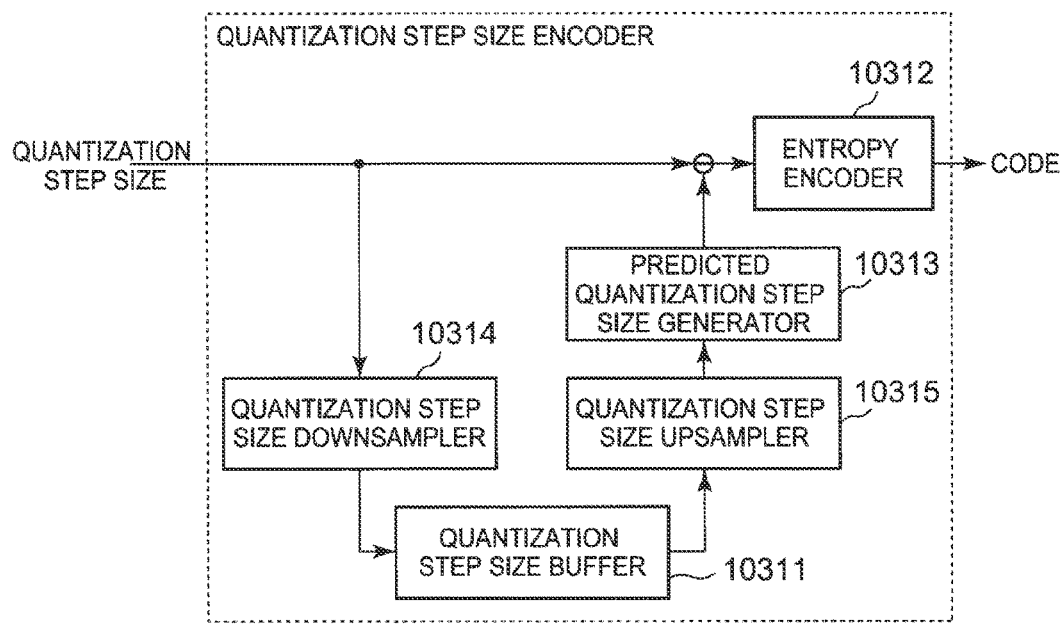
FIG. 4 is a block diagram showing a quantization step size encoder in a video encoding device in Exemplary Embodiment 3 of the present invention.

FIG. 4 is a block diagram showing a structure of a quantization step size encoder in the video encoding device in Exemplary Embodiment 3 of the present invention. As shown in FIG. 4, the structure of the quantization step size encoder in this exemplary embodiment differs from that of the quantization step size encoder in the video encoding device in Exemplary Embodiment 1 shown in FIG. 1 in that a quantization step size downsampler 10314 and a quantization step size upsampler 10315 are included.

The operations of the predicted quantization step size generator 10313 and the entropy encoder 10312 are the same as the operations in the quantization step size encoder in the video encoding device in Exemplary Embodiment 1, and so their description is omitted here.

The quantization step size downsampler 10314 downsamples quantization step sizes assigned to encoded image blocks based on a predetermined method, and supplies the result to the quantization step size buffer 10311.

The quantization step size buffer 10311 stores and holds downsampled quantization step sizes of previously encoded image blocks supplied from the quantization step size downsampler 10314.

The quantization step size upsampler 10315 retrieves downsampled quantization step sizes of previously encoded image blocks from the quantization step size buffer 10311, upsamples the retrieved downsampled quantization step sizes based on a predetermined method, and supplies the result to the predicted quantization step size generator 10313.

With this structure, the video encoding device in this exemplary embodiment can reduce the required capacity of the quantization step size buffer, as compared with the video encoding device in Exemplary Embodiment 1. As a result, the increase in required memory size for varying the quantization step size in the video encoding device can be further prevented.

The following describes a detailed operation of the above-mentioned quantization step size encoder in the video encoding device in Exemplary Embodiment 3, using a specific example.

Figure 5:
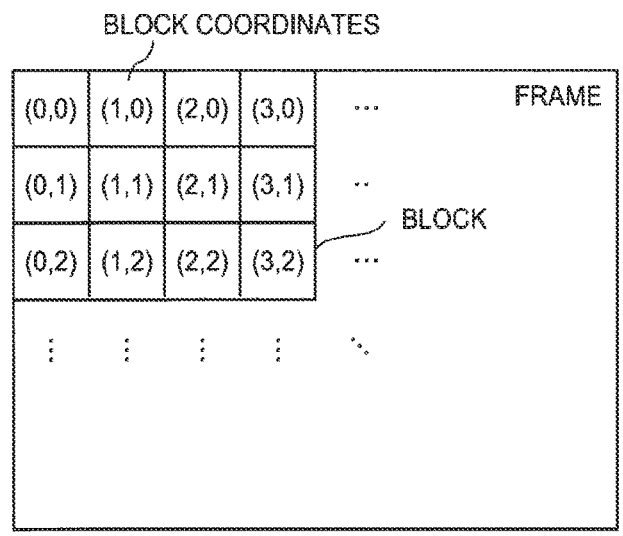
FIG. 5 is an explanatory diagram showing an example of block coordinates.

In this example, it is assumed that image blocks as an encoding unit are fixed in size, and each image block is expressed by two-dimensional block coordinates with the block at the upper left corner in a frame being set as the origin, as shown in FIG. 5. The neighboring image blocks used for quantization step size prediction are three image blocks that are left adjacent, upper adjacent, and upper right adjacent in the same image frame.

Suppose the current image block to be encoded is X, and the block coordinates of the block X are (x(X), y(X)). Also suppose the left adjacent block positioned at the block coordinates (x(X)−1, y(X)) is A, the upper adjacent block positioned at the block coordinates (x(X), y(X)−1) is B, and the upper right adjacent block positioned at the block coordinates (x(X)+1, y(X)−1) is C, as shown in FIG. 2. When an encoded quantization step size in an arbitrary block Z is denoted by Q(Z) and a predicted quantization step size by pQ(Z), the predicted quantization step size generator 10313 computes a predicted quantization step size pQ(X) of the block X by the following equation (6).

$$pQ(X) = \mathrm{Median}(Q_{ds}(A), Q_{ds}(B), Q_{ds}(C)) \quad (6).$$

Here, Median(x, y, z) is a function that finds a median value from three values x, y, and z. $Q_{ds}(Z)$ denotes a quantization step size representative value in the block Z. When the block coordinates of Z are (x(Z), y(Z)) and a block positioned at the block coordinates (v, w) is denoted by Blk(v, w), $Q_{ds}(Z)$ is computed by the following equation (7).

$$Q_{ds}(Z) = Q(Blk(N*(x(Z)/N), N*(y(Z)/N))) \quad (7).$$

Here, N is a numeric value indicating a downsampling factor. For example, N=4 means downsampling by ¼ in the horizontal direction and by ¼ in the vertical direction. (a*b) denotes multiplication of a by b, and (a/b) denotes division of the integer a by b (the fractional portion dropped).

According to the operation defined by the above-mentioned equations (6) and (7), upon referencing to quantization step sizes supplied from the quantization step size buffer 10311 via the quantization step size upsampler 10315, the predicted quantization step size generator 10313 references to, in units of $N^2$ blocks of horizontal N blocks×vertical N blocks, only one quantization step size at the upper left corner as the representative value. The quantization step size downsampler 10314 accordingly operates so as not to supply the other quantization step sizes to the quantization step size buffer 10311. As a result, the required memory capacity of the quantization step size buffer 10311 can be reduced to $1/N_2$.

The entropy encoder 10312 entropy-encodes the obtained predicted quantization step size and outputs the result. The operation of the entropy encoder 10312 is the same as the specific operation example in the video encoding device in Exemplary Embodiment 1.

Though three image blocks that are left adjacent, upper adjacent, and upper right adjacent in the same image frame are used as the neighboring image blocks for quantization step size prediction in this example, the neighboring image blocks are not limited to such. For instance, image blocks that are left adjacent, upper adjacent, and upper left adjacent may be used to compute the predicted quantization step size by the following equation (8), in stead of the equation (6).

$$pQ(X) = \mathrm{Median}(Q_{ds}(A), Q_{ds}(B), Q_{ds}(D)) \quad (8).$$

Here, D is the block upper left adjacent to the block X and positioned at the block coordinates (x(X)−1, y(X)−1).

The number of image blocks used for prediction is not limited to three, and may be any number. Moreover, not a median value but a mean value or the like may be computed for prediction. In addition, the image blocks used for prediction do not necessarily need to be adjacent to the current image block to be encoded, and may be apart from the current image block to be encoded by a predetermined distance. Furthermore, the image blocks used for prediction are not limited to spatially neighboring image blocks, i.e. image blocks in the same image frame. The image blocks used for prediction may be temporally neighboring image blocks, i.e. image blocks in an already encoded image frame other than the current image frame, or any other neighboring image blocks.

Though the image block to be encoded and the image blocks used for prediction are assumed to have the same fixed size in this example, the present invention is not limited to the case where image blocks as an encoding unit are fixed in size. Image blocks as an encoding unit may be variable in size, that is, the image block to be encoded and the image blocks used for prediction may have different sizes.

Though one quantization step size at the upper left corner is selected as the quantization step size representative value in units of $N^2$ blocks of horizontal N blocks×vertical N blocks in this example, the present invention is not limited to this. One quantization step size may be selected from an arbitrary sampling position. Alternatively, a plurality of quantization step sizes may be selected from arbitrary sampling positions, with a mean value of the plurality of quantization step sizes being set as the quantization step size representative value. For example, the quantization step size representative value may be computed by the following equation (9) instead of equation (7), and any computation other than mean value computation, such as median value computation, may be used.

[Math. 1]

$$Q_{ds}(Z) = \frac{1}{N^2} \sum_{i=0}^{N-1} \sum_{j=0}^{N-1} Q(Blk(N*(x(Z)//N) + i, N*(y(Z)//N) + j)) \quad (9)$$

Though horizontal downsampling and vertical downsampling are performed at the same factor in this example, different factors may be used in the horizontal direction and the vertical direction. Alternatively, downsampling may be performed in only one of the horizontal direction and the vertical direction. Any other method of downsampling is applicable, too.

This completes the description of the video encoding device in Exemplary Embodiment 3 of the present invention.

Exemplary Embodiment 4

A video decoding device in Exemplary Embodiment 4 of the present invention includes the variable length decoder 201, the inverse quantizer 202, the inverse frequency transformer 203, the frame memory 204, the intra-frame predictor 205, the inter-frame predictor 206, the prediction selector 207, and the bitstream buffer 208 as shown in FIG. 20, like the video decoding device in Exemplary Embodiment 2 of the present invention. The quantization step size decoder included in the variable length decoder 201 has, however, a structure different from the structures shown in FIGS. 21 and 3.

Figure 6:
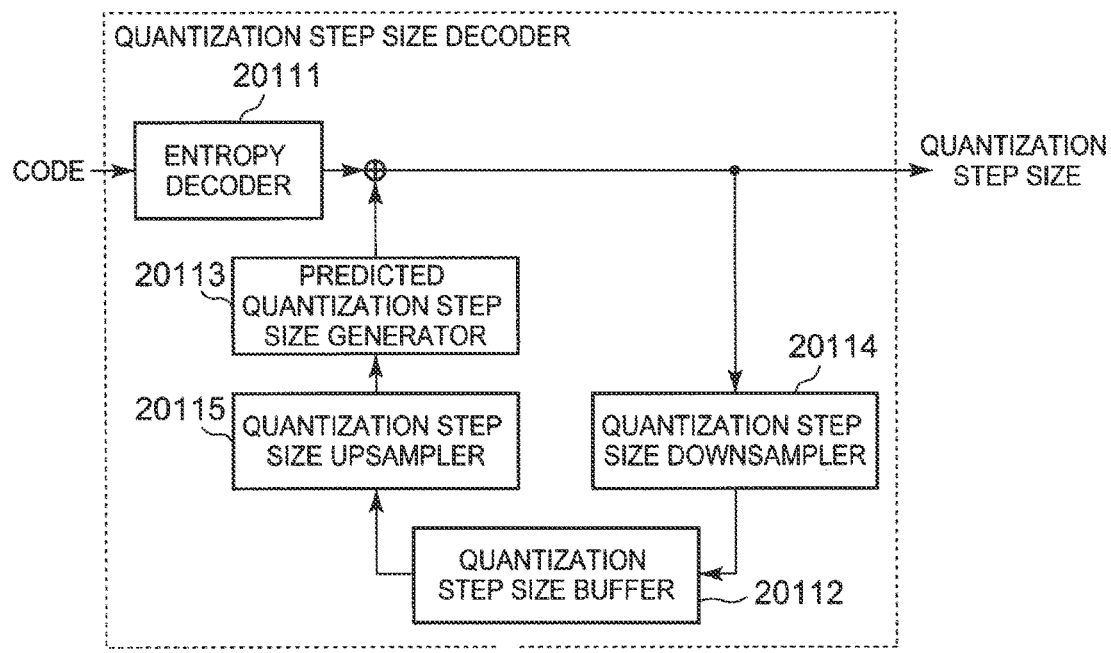
FIG. 6 is a block diagram showing a quantization step size decoder in a video decoding device in Exemplary Embodiment 4 of the present invention.

FIG. 6 is a block diagram showing a structure of a quantization step size decoder in the video decoding device in Exemplary Embodiment 4 of the present invention. As shown in FIG. 6, the quantization step size decoder for decoding the quantization step size in the variable length decoder 201 in the video decoding device in this exemplary embodiment differs from the quantization step size decoder in the video decoding device in Exemplary Embodiment 2 shown in FIG. 3 in that a quantization step size downsampler 20114 and a quantization step size upsampler 20115 are included.

The operations of the predicted quantization step size generator 20113 and the entropy decoder 20111 are the same as the operations in the quantization step size decoder in the video decoding device in Exemplary Embodiment 2, and so their description is omitted here.

The quantization step size downsampler 20114 downsamples previously decoded quantization step sizes based on a predetermined method, and supplies the result to the quantization step size buffer 20112.

The quantization step size buffer 20112 stores and holds downsampled previously decoded quantization step sizes supplied from the quantization step size downsampler 20114.

The quantization step size upsampler 20115 retrieves downsampled previously decoded quantization step sizes from the quantization step size buffer 20112, upsamples the retrieved downsampled previously decoded quantization step sizes based on a predetermined method, and supplies the result to the predicted quantization step size generator 20113.

The predicted quantization step size generator 20113 computes the predicted quantization step size pQ(X) of the block X, by the above-mentioned equation (6) or (8).

With this structure, the video decoding device in this exemplary embodiment can reduce the required capacity of the quantization step size buffer, as compared with the video encoding device in Exemplary Embodiment 2. As a result, the increase in required memory size for varying the quantization step size in the video encoding device can be further prevented.

Exemplary Embodiment 5

Figure 7:
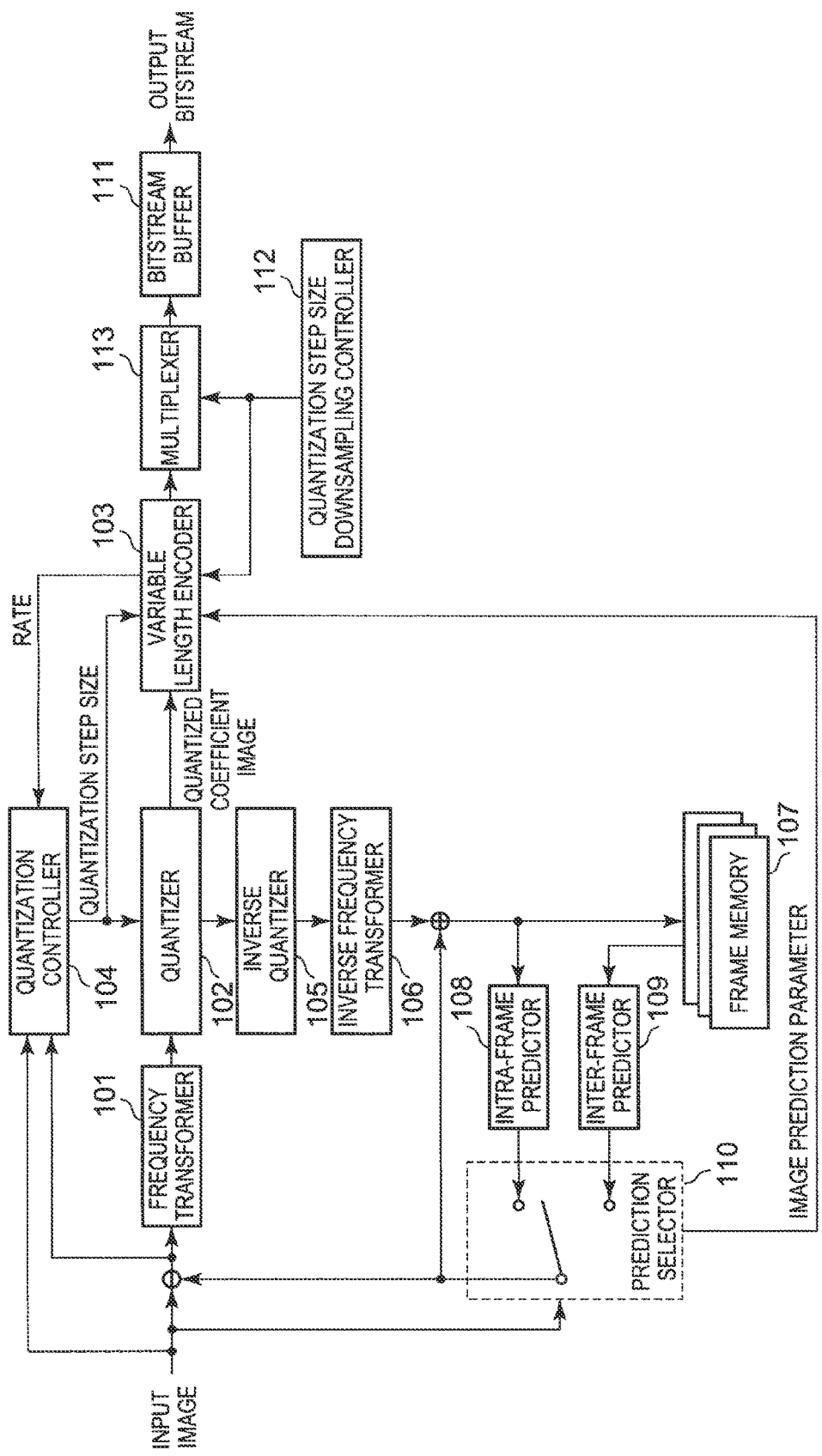
FIG. 7 is a block diagram showing a video encoding device in Exemplary Embodiment 5 of the present invention.
Figures 8, 9:
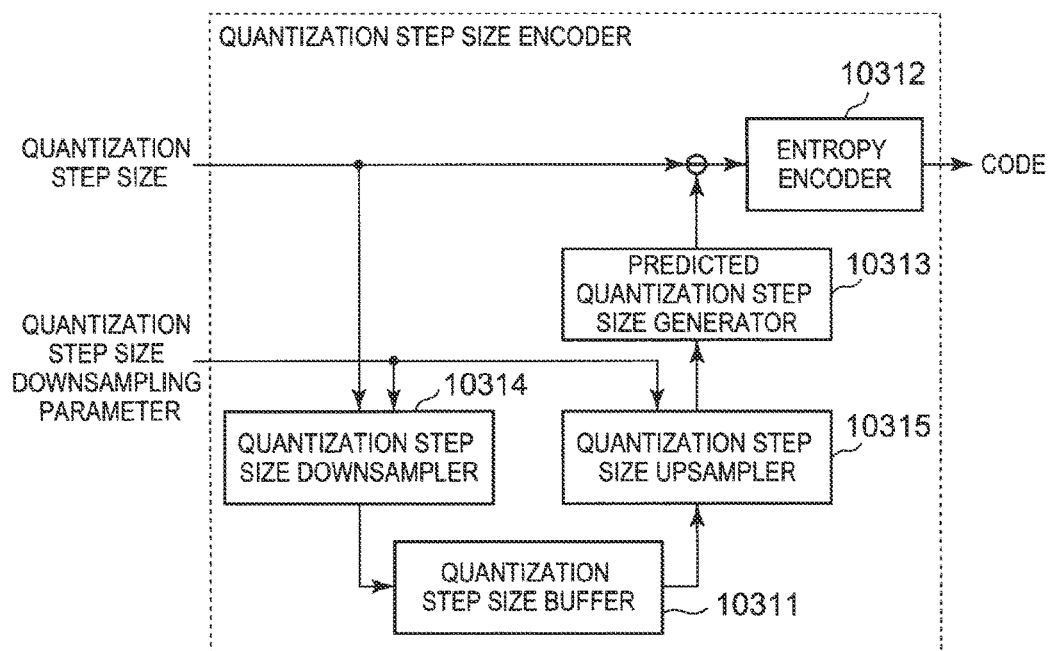
FIG. 8 is a block diagram showing a quantization step size encoder in the video encoding device in Exemplary Embodiment 5 of the present invention.
FIG. 9 is an explanatory diagram showing a list representing an example of multiplexing of a quantization step size downsampling parameter.

FIG. 7 is a block diagram showing a structure of a video encoding device in Exemplary Embodiment 5 of the present invention. FIG. 8 is a block diagram showing a structure of a quantization step size encoder in the video encoding device in this exemplary embodiment.

As shown in FIG. 7, the video encoding device in this exemplary embodiment differs from the video encoding device in Exemplary Embodiment 3 (see FIG. 18) in that a quantization step size downsampling controller 112 and a multiplexer 113 are included. As shown in FIG. 8, the quantization step size encoder for encoding the quantization step size in the variable length encoder 103 in the video encoding device in this exemplary embodiment differs from the quantization step size encoder in Exemplary Embodiment 3 shown in FIG. 4 in that a quantization step size downsampling parameter is supplied from the quantization step size downsampling controller 112 shown in FIG. 7 to the quantization step size downsampler 10314 and the quantization step size upsampler 10315.

The quantization step size downsampling controller 112 supplies control information for defining the downsampling operation in the quantization step size downsampler 10314 and the upsampling operation in the quantization step size upsampler 10315, to the variable length encoder 103 and the multiplexer 113. The control information for defining the quantization step size downsampling operation and upsampling operation is referred to as "quantization step size downsampling parameter". The quantization step size downsampling parameter includes a value of a number N indicating downsampling granularity.

The multiplexer 113 multiplexes the above-mentioned quantization step size downsampling parameter in a video bitstream supplied from the variable length encoder 103, and outputs the result as a bitstream.

The quantization step size downsampler 10314 downsamples quantization step sizes assigned to encoded image blocks based on a method defined by the quantization step size downsampling parameter, and supplies the result to the quantization step size buffer 10311.

The quantization step size upsampler 10315 retrieves downsampled quantization step sizes of previously encoded image blocks from the quantization step size buffer 10311, upsamples the retrieved downsampled quantization step sizes based on a method defined by the quantization step size downsampling parameter, and supplies the result to the predicted quantization step size generator 10313.

With this structure, the video encoding device in this exemplary embodiment can reduce the required capacity of the quantization step size buffer, as compared with the video encoding device in Exemplary Embodiment 1. Moreover, the video encoding device in this exemplary embodiment can control the downsampling granularity so as not to lower the correlation between the quantization step size to be encoded and the quantization step sizes used for prediction, as compared with the video encoding device in Exemplary Embodiment 3. This can reduce the amount of code necessary to encode the quantization step size. That is, the video encoding device in this exemplary embodiment can optimize the balance between the reduction in required capacity of the quantization step size buffer and the reduction in amount of code necessary to encode the quantization step size, as compared with the video encoding devices in Exemplary Embodiments 1 and 3. As a result, the increase in required memory size associated with the variation of the quantization step size can be prevented.

The following describes a detailed operation of the above-mentioned video encoding device in Exemplary Embodiment 5, using a specific example.

In this example, the quantization step size encoder performs the same operation as the specific operation example in the video encoding device in Exemplary Embodiment 3, except that the number N indicating the downsampling granularity in the above-mentioned equation (7) or (9) is supplied from the quantization step size downsampling controller 112.

For example, the multiplexer 113 multiplexes the value of N mentioned above in the bitstream as a part of header information as exemplified in a list in FIG. 9 according to "Specification of syntax functions, categories, and descriptors" in NPL 1, where temporal_qp_buffer_decimation_depth=log$_2$N.

Though the value of the number N indicating the downsampling granularity is used as the quantization step size downsampling parameter in this example, the present invention is not limited to such, and any other parameter may be used as the quantization step size downsampling parameter. For instance, a sampling position when selecting, in units of N$^2$ blocks of horizontal N blocks×vertical N blocks, one quantization step size as the quantization step size representative value may be used as the quantization step size downsampling parameter. Alternatively, information indicating the type of computation when generating the quantization step size representative value using a plurality of quantization step sizes may be used as the quantization step size downsampling parameter.

Exemplary Embodiment 6

Figure 10:
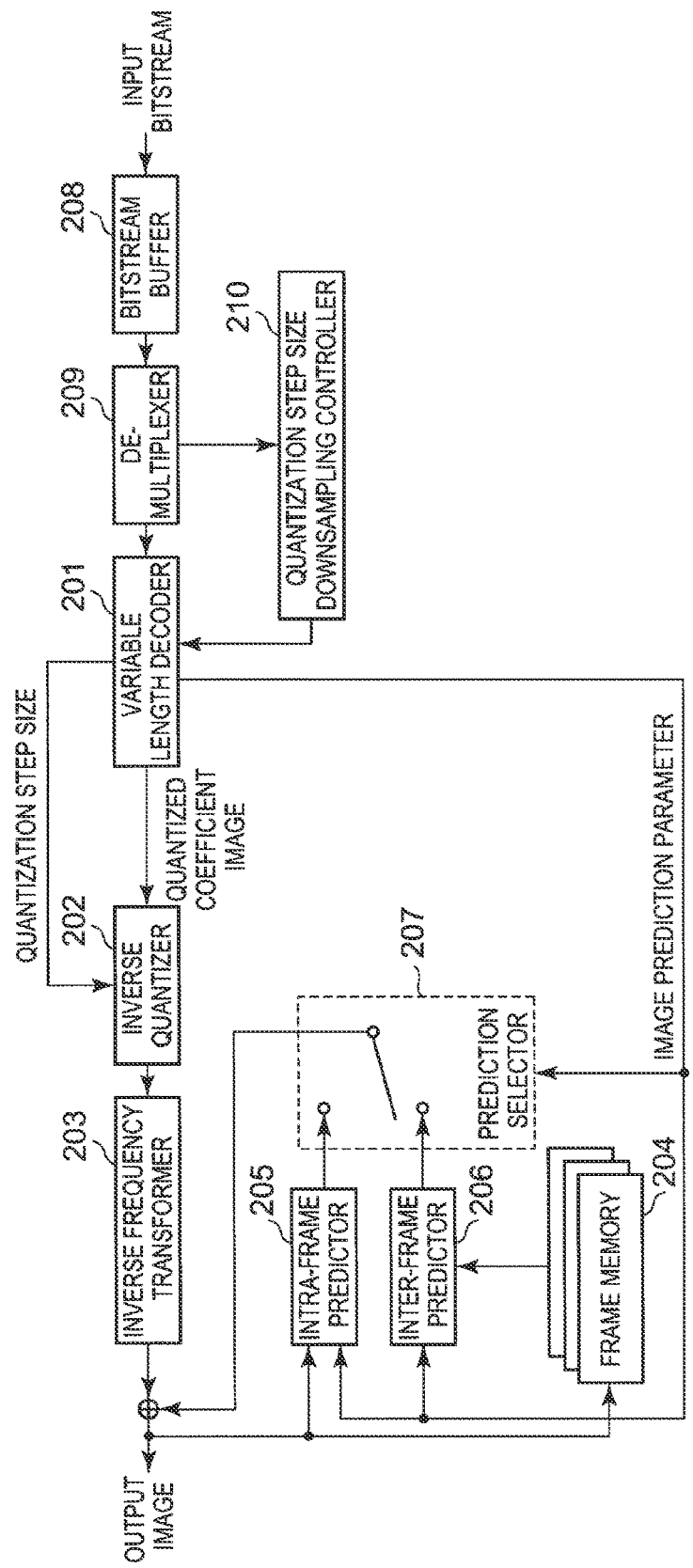
FIG. 10 is a block diagram showing a video decoding device in Exemplary Embodiment 6 of the present invention.
Figure 11:
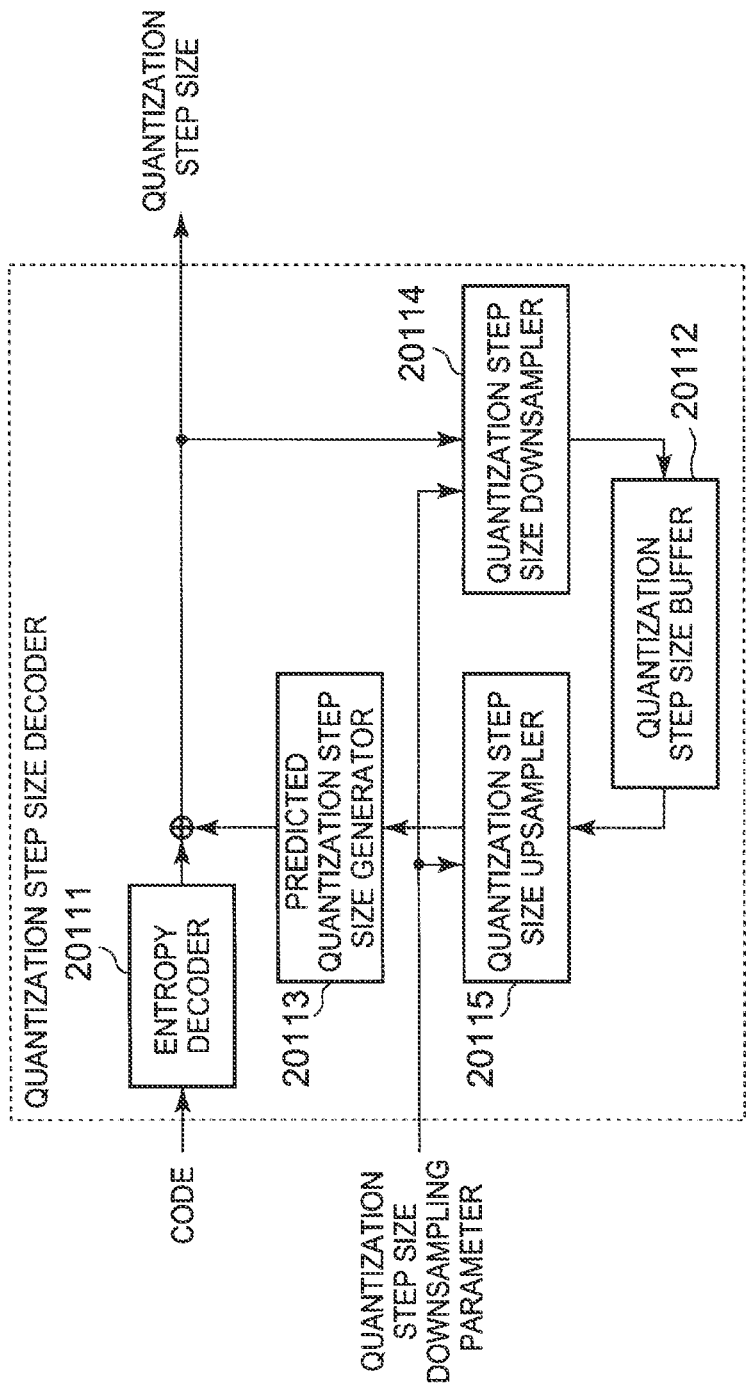
FIG. 11 is a block diagram showing a quantization step size decoder in the video decoding device in Exemplary Embodiment 6 of the present invention.

FIG. 10 is a block diagram showing a structure of a video decoding device in Exemplary Embodiment 6 of the present invention. FIG. 11 is a block diagram showing a structure of a quantization step size decoder in the video decoding device in this exemplary embodiment. As shown in FIG. 10, the video decoding device in this exemplary embodiment differs from the video decoding device in Exemplary Embodiment 4 (see FIG. 20) in that a de-multiplexer 209 and a quantization step size downsampling controller 210 are included. As shown in FIG. 11, the quantization step size decoder for decoding the quantization step size in the variable length decoder 201 in the video decoding device in this exemplary embodiment differs from the quantization step size decoder in Exemplary Embodiment 4 shown in FIG. 6 in that a quantization step size downsampling parameter is supplied from the quantization step size downsampling controller 210 shown in FIG. 10 to the quantization step size downsampler 20114 and the quantization step size upsampler 20115.

The de-multiplexer 209 de-multiplexes a bitstream supplied from the bitstream buffer 208, to extract a video bitstream and control information for defining the downsampling operation in the quantization step size downsampler 20114 and the upsampling operation in the quantization step size upsampler 20115. The control information for defining the quantization step size downsampling operation and upsampling operation is referred to as "quantization step size downsampling parameter". The quantization step size downsampling parameter includes a value of a number N indicating downsampling granularity, as mentioned above.

The quantization step size downsampler 20114 downsamples previously decoded quantization step sizes based on a method defined by the quantization step size downsampling parameter, and supplies the result to the quantization step size buffer 20112.

The quantization step size upsampler 20115 retrieves downsampled quantization step sizes of previously decoded image blocks from the quantization step size buffer 20112, upsamples the retrieved downsampled quantization step sizes based on a method defined by the quantization step size downsampling parameter, and supplies the result to the predicted quantization step size generator 20113.

The predicted quantization step size generator 20113 computes the predicted quantization step size pQ(X) of the block X, by the above-mentioned equation (6) or (8).

With this structure, the video decoding device in this exemplary embodiment can reduce the required capacity of the quantization step size buffer, as compared with the video decoding device in Exemplary Embodiment 2. Moreover, the video decoding device in this exemplary embodiment can perform downsampling under such control as not to lower the correlation between the quantization step size to be decoded and the quantization step sizes used for prediction, as compared with the video decoding device in Exemplary Embodiment 4. Hence, only a smaller amount of code needs to be received to decode the quantization step size. That is, the video decoding device in this exemplary embodiment can optimize the balance between the reduction in required capacity of the quantization step size buffer and the reduction in amount of code received for decoding the quantization step size, as compared with the video decoding devices in Exemplary Embodiments 2 and 4. As a result, the increase in required memory size associated with the variation of the quantization step size can be prevented.

Each of the exemplary embodiments described above may be realized not only by hardware but also by a computer program.

Figure 12:
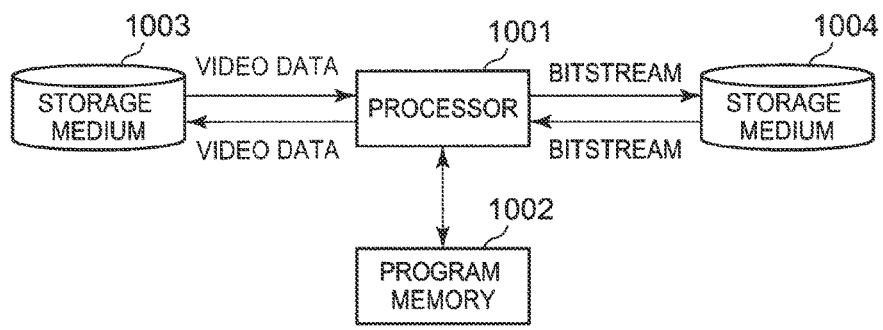
FIG. 12 is a block diagram showing an example of a structure of an information processing system capable of realizing functions of a video encoding device and an video decoding device according to the present invention.

An information processing system shown in FIG. 12 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. As a storage medium, a magnetic storage medium such as a hard disk is available.

In the information processing system shown in FIG. 12, a program for realizing the functions of the blocks (including the blocks shown in each of FIGS. 1, 3, 4, 6, 8, and 11, except the block of the buffer) shown in each of FIGS. 18, 20, 7, and 10 is stored in the program memory 1002. The processor 1001 realizes the functions of the video encoding device or the video decoding device shown in each of FIGS. 18, 20, 7, and 10 and FIGS. 1, 3, 4, 6, 8, and 11, by executing processes according to the program stored in the program memory 1002.

Figure 13:
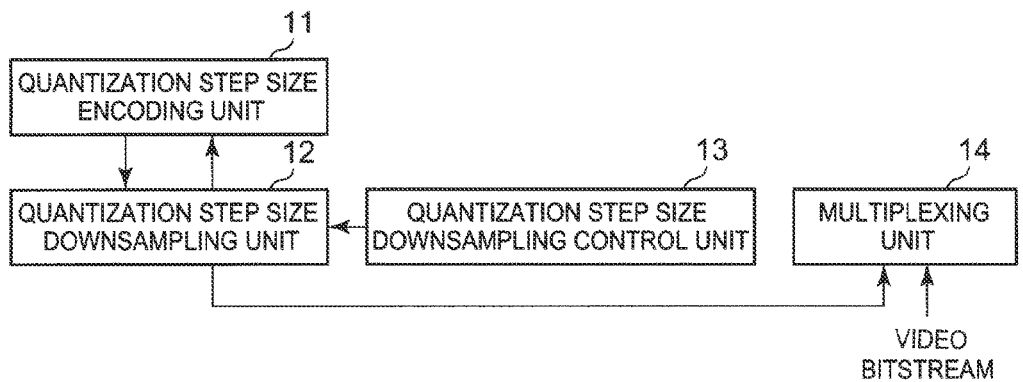
FIG. 13 is a block diagram showing characteristic components in a video encoding device according to the present invention.

FIG. 13 is a block diagram showing characteristic components in a video encoding device according to the present invention. As shown in FIG. 13, the video encoding device according to the present invention includes: a quantization step size encoding unit 11 for encoding a quantization step size for controlling quantization granularity; and a quantization step size downsampling unit 12 for downsampling one or more encoded quantization step sizes to generate a quantization step size representative value, wherein the quantization step size encoding unit 11 predicts the quantization step size using the quantization step size representative value.

The video encoding device may further include: a quantization step size downsampling control unit 13 for controlling an operation of the quantization step size downsampling unit 12 based on a predetermined operation parameter; and a multiplexing unit 14 for multiplexing at least a part of the operation parameter of the quantization step size downsampling unit 12, in a compression-encoded video bitstream.

Figure 14:
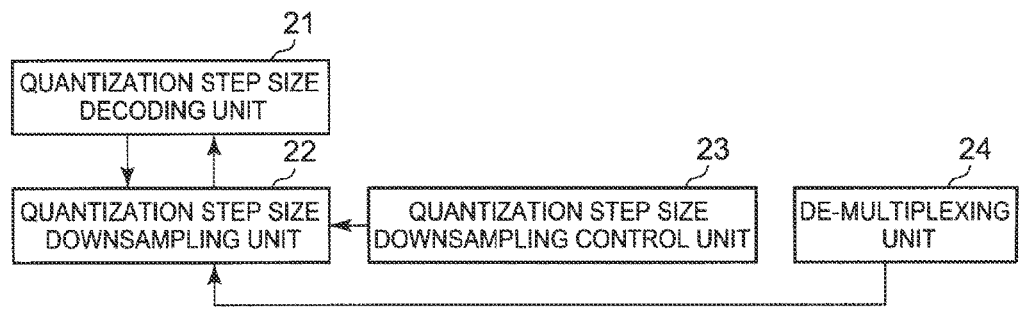
FIG. 14 is a block diagram showing characteristic components in a video decoding device according to the present invention.

FIG. 14 is a block diagram showing characteristic components in a video decoding device according to the present invention. As shown in FIG. 14, the video decoding device according to the present invention includes: a quantization step size decoding unit 21 for decoding a quantization step size for controlling inverse quantization granularity; and a quantization step size downsampling unit 22 for downsampling one or more decoded quantization step sizes to generate a quantization step size representative value, wherein the quantization step size decoding unit 21 predicts the quantization step size using the quantization step size representative value.

The video decoding device may further include: a quantization step size downsampling control unit 23 for controlling an operation of the quantization step size downsampling unit 22 based on a predetermined operation parameter; and a de-multiplexing unit 24 for de-multiplexing a bitstream including at least a part of the operation parameter of the quantization step size downsampling unit 12.

Figure 15:
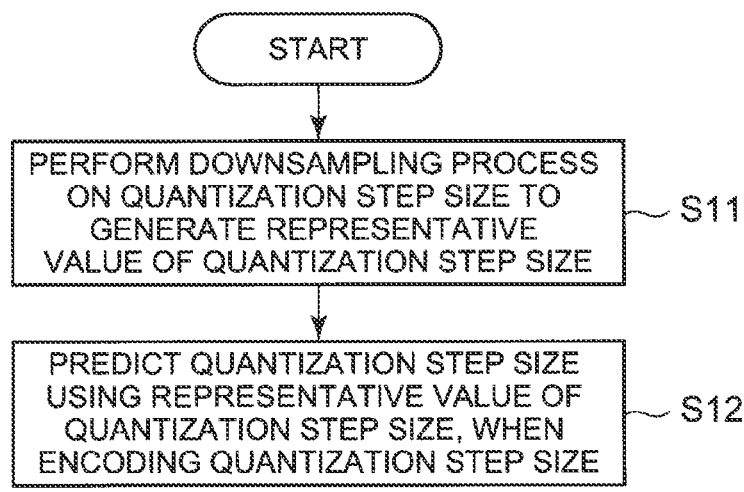
FIG. 15 is a flowchart showing characteristic steps in a video encoding method according to the present invention.

FIG. 15 is a flowchart showing characteristic steps in a video encoding method according to the present invention. As shown in FIG. 15, the video encoding method includes: a step 11 of performing a downsampling process on one or more encoded quantization step sizes to generate a quantization step size representative value; and a step S12 of, when encoding a quantization step size for controlling quantization granularity, predicting the quantization step size using the quantization step size representative value.

Figure 16:
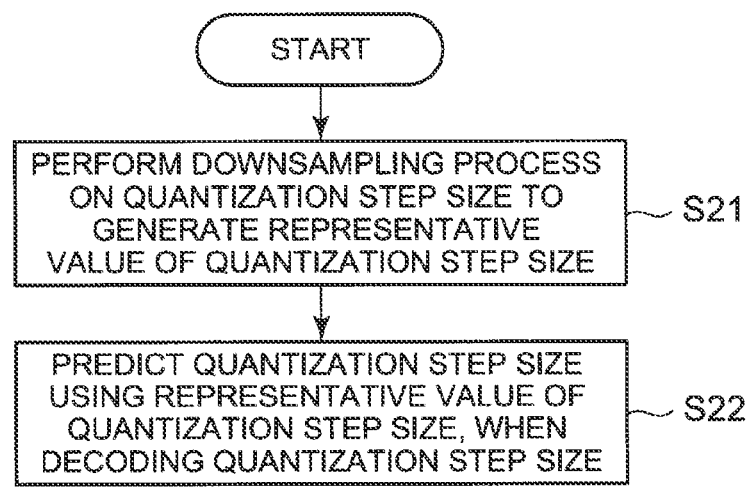
FIG. 16 is a flowchart showing characteristic steps in a video decoding method according to the present invention.
Figure 17:
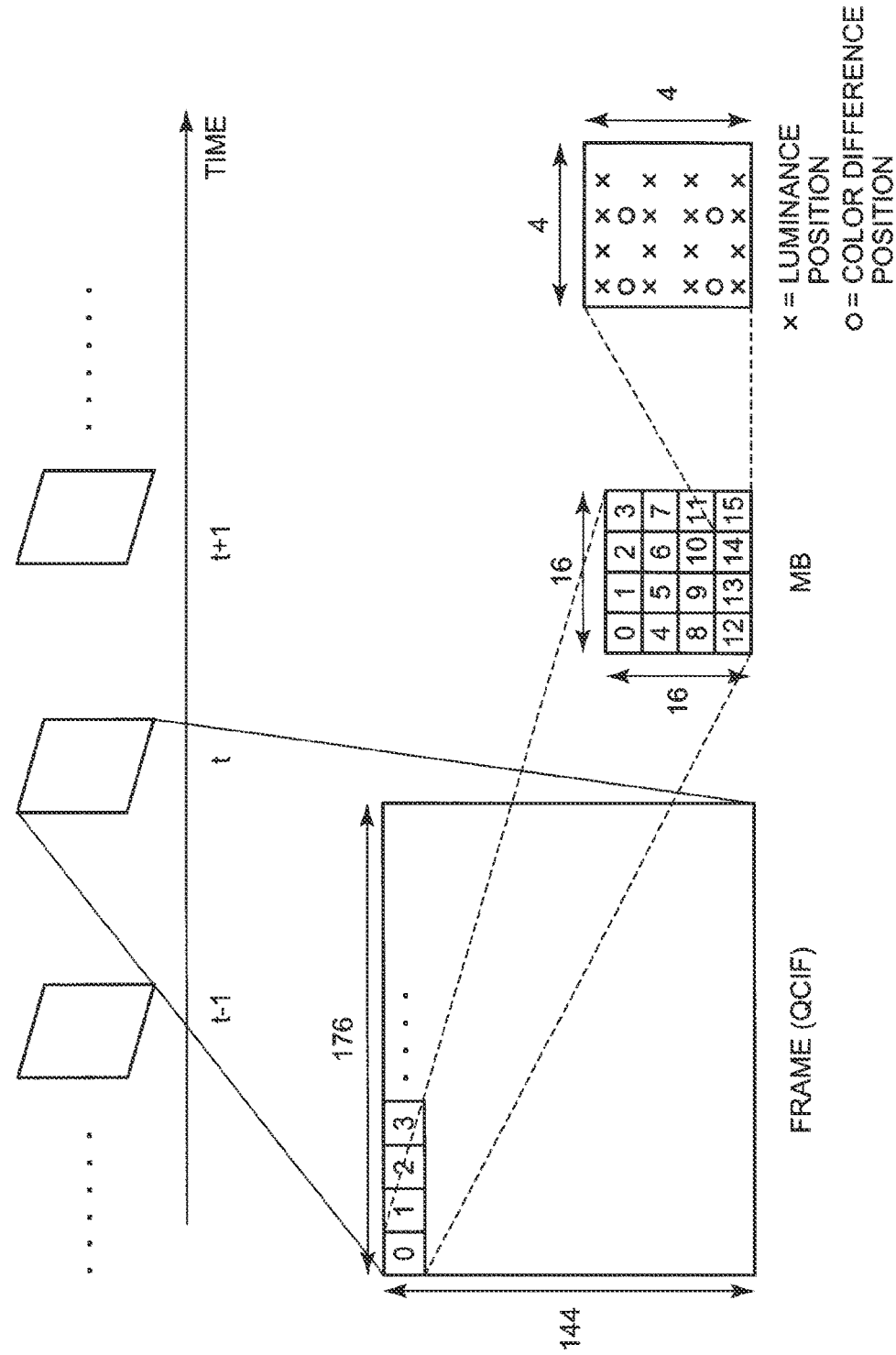
FIG. 17 is an explanatory diagram showing an example of block division.

FIG. 16 is a flowchart showing characteristic steps in an video decoding method according to the present invention. As shown in FIG. 16, the video decoding method includes: a step S21 of performing a downsampling process on one or more decoded quantization step sizes to generate a quantization step size representative value; and a step S22 of, when decoding a quantization step size for controlling quantization granularity, predicting the quantization step size using the quantization step size representative value.

The exemplary embodiments described above may be partly or wholly described in the following supplementary notes, though the present invention is not limited to the following structures.

(Supplementary note 1) A video encoding method for dividing input video data into blocks of a predetermined size and applying quantization to each image block obtained by division, to perform a compression-encoding process, including: performing a downsampling process on one or more encoded quantization step sizes to generate a quantization step size representative value; and, when encoding a quantization step size for controlling granularity of the quantization, predicting the quantization step size using the quantization step size representative value.

(Supplementary note 2) The video encoding method according to supplementary note 1, wherein, as the quantization step size representative value, a quantization step size representative value generated using at least an encoded quantization step size in the current frame is used.

(Supplementary note 3) The video encoding method according to supplementary note 1, wherein, as the quantization step size representative value, a quantization step size representative value generated using at least an encoded quantization step size in a different frame is used.

(Supplementary note 4) The video encoding method according to any of supplementary notes 1 to 3, including: controlling an operation of the downsampling process based on a predetermined operation parameter; and multiplexing at least a part of the operation parameter of the downsampling process, in a compression-encoded video bitstream.

(Supplementary note 5) The video encoding method according to supplementary note 4, wherein the operation parameter includes at least a downsampling factor.

(Supplementary note 6) A video decoding method for decoding image blocks by applying inverse quantization to input compressed video data, to perform a generation process of video data as a set of the image blocks, including: performing a downsampling process on one or more decoded quantization step sizes to generate a quantization step size representative value; and, when decoding a quantization step size for controlling granularity of the quantization, predicting the quantization step size using the quantization step size representative value.

(Supplementary note 7) The video decoding method according to supplementary note 6, wherein, as the quantization step size representative value, a quantization step size representative value generated using at least a decoded quantization step size in the current frame is used.

(Supplementary note 8) The video decoding method according to supplementary note 6, wherein, as the quantization step size representative value, a quantization step size representative value generated using at least a decoded quantization step size in a different frame is used.

(Supplementary note 9) The video decoding method according to any of supplementary notes 6 to 8, including: de-multiplexing a bitstream including at least a part of an operation parameter; and controlling an operation of the downsampling process based on the operation parameter.

(Supplementary note 10) The video decoding method according to supplementary note 9, wherein the operation parameter includes at least a downsampling factor.

(Supplementary note 11) A video encoding program in a video encoding device for dividing input video data into blocks of a predetermined size and applying quantization to each image block obtained by division, to perform a compression-encoding process, causing a computer to execute: a process of performing a downsampling process on one or more encoded quantization step sizes to generate a quantization step size representative value; and a process of, when encoding a quantization step size for controlling granularity of the quantization, predicting the quantization step size using the quantization step size representative value.

(Supplementary note 12) The video encoding program according to supplementary note 11, causing the computer to execute a process of predicting the quantization step size using a quantization step size representative value generated using at least an encoded quantization step size in the current frame.

(Supplementary note 13) The video encoding program according to supplementary note 11, causing the computer to execute a process of predicting the quantization step size using a quantization step size representative value generated using at least an encoded quantization step size in a different frame.

(Supplementary note 14) The video encoding program according to any of supplementary notes 11 to 13, causing the computer to execute: the downsampling process based on a predetermined operation parameter; and a process of multiplexing at least a part of the operation parameter of the downsampling process, in a compression-encoded video bitstream.

(Supplementary note 15) The video encoding program according to supplementary note 14, causing the computer to execute the downsampling process using, as the operation parameter, at least a downsampling factor.

(Supplementary note 16) A video decoding program in a video decoding device for decoding image blocks by applying inverse quantization to input compressed video data, to perform a generation process of video data as a set of the image blocks, causing a computer to execute: a process of performing a downsampling process on one or more decoded quantization step sizes to generate a quantization step size representative value; and a process of, when decoding a quantization step size for controlling granularity of the quantization, predicting the quantization step size using the quantization step size representative value.

(Supplementary note 17) The video decoding program according to supplementary note 16, causing the computer to execute a process of predicting the quantization step size using a quantization step size representative value generated using at least a decoded quantization step size in the current frame.

(Supplementary note 18) The video decoding program according to supplementary note 16, causing the computer to execute a process of predicting the quantization step size using a quantization step size representative value generated using at least a decoded quantization step size in a different frame.

(Supplementary note 19) The video decoding program according to any of supplementary notes 16 to 18, causing the computer to execute: a process of de-multiplexing a bitstream including at least a part of an operation parameter; and the downsampling process based on the operation parameter.

(Supplementary note 20) The video decoding program according to supplementary note 19, causing the computer to execute the downsampling process using, as the operation parameter, at least a downsampling factor.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2011-143249 filed on Jun. 28, 2011, the disclosure of which is incorporated herein in its entirety.

REFERENCE SIGNS LIST 11 quantization step size encoding unit
12 quantization step size downsampling unit
13 quantization step size downsampling control unit
14 multiplexing unit
21 quantization step size decoding unit
22 quantization step size downsampling unit
23 quantization step size downsampling control unit
24 de-multiplexing unit
101 frequency transformer
102 quantizer
103 variable length encoder
104 quantization controller
105 inverse quantizer
106 inverse frequency transformer
107 frame memory
108 intra-frame predictor
109 inter-frame predictor
110 prediction selector
111 bitstream buffer
112 quantization step size downsampling controller
113 multiplexer
201 variable length decoder
202 inverse quantizer
203 inverse frequency transformer
204 frame memory
205 intra-frame predictor
206 inter-frame predictor
207 prediction selector
208 bitstream buffer
209 de-multiplexer
210 quantization step size downsampling controller
1001 processor
1002 program memory
1003 storage medium
1004 storage medium
10311 quantization step size buffer
10312 entropy encoder
10313 predicted quantization step size generator
10314 quantization step size downsampler
10315 quantization step size upsampler
20111 entropy decoder
20112 quantization step size buffer
20113 predicted quantization step size generator
20114 quantization step size downsampler
20115 quantization step size upsampler

The invention claimed is:

1. A video encoding device for dividing input video data into blocks of a predetermined size and applying quantization to each image block obtained by division, to perform a compression-encoding process, comprising:
at least one processor configured to execute machine-readable instructions to implement:
a quantization step size encoding unit configured to encode a quantization step size for controlling granularity of the quantization;
a quantization step size downsampling unit configured to downsample one or more encoded quantization step sizes to generate a quantization step size representative value;
a quantization step size representative value storing unit configured to store the quantization step size representative values generated by the quantization step size downsampling unit;
a quantization step size downsampling control unit configured to control an operation of the quantization step size downsampling unit based on a predetermined operation parameter including at least one of a downsampling scale factor or information indicating a type of computation when generating the quantization step size representative value; and
a multiplexer configured to multiplex at least the operation parameter of the quantization step size downsampling unit, in a compression-encoded video bitstream,
wherein the quantization step size encoding unit is configured to predict the quantization step size using the quantization step size representative value.

2. The video encoding device according to claim 1, wherein the quantization step size encoding unit is configured to use, as the quantization step size representative value, a quantization step size representative value generated using at least an encoded quantization step size in the current frame.

3. The video encoding device according to claim 1, wherein the quantization step size encoding unit is configured to use, as the quantization step size representative value, a quantization step size representative value generated using at least an encoded quantization step size in a different frame.

4. A video decoding device for decoding image blocks by applying inverse quantization to input compressed video data, to perform a generation process of video data as a set of the image blocks, comprising:

a quantization step size decoding unit comprising a processor configured to decode quantization step size for controlling granularity of the inverse quantization;

a quantization step size downsampling unit comprising a second processor configured to downsample one or more decoded quantization step sizes to generate a quantization step size representative value;

a quantization step size representative value storing unit configured to store the quantization step size representative values generated by the quantization step size downsampling unit;

a quantization step size downsampling control unit configured to control an operation of the quantization step size downsampling unit based on a predetermined operation parameter including at least one of a downsampling scale factor or information indicating a type of computation when generating the quantization step size representative value; and a de-multiplexer configured to de-multiplex a bitstream including at least the operation parameter of the quantization step size downsampling unit, wherein the quantization step size decoding unit is configured to predict the quantization step size using the quantization step size representative value.

5. The video decoding device according to claim 4, wherein the quantization step size decoding unit is configured to use, as the quantization step size representative value, a quantization step size representative value generated using at least a decoded quantization step size in the current frame.

6. The video decoding device according to claim 4, wherein the quantization step size decoding unit is configured to use, as the quantization step size representative value, a quantization step size representative value generated using at least a decoded quantization step size in a different frame.

7. A method, implemented by a processor, for dividing input video data into blocks of a predetermined size and applying quantization to each image block obtained by division, to perform a compression-encoding process, comprising:

encoding, with the processor, a quantization step size for controlling granularity of the quantization;

downsampling, with the processor, one or more encoded quantization step sizes to generate a quantization step size representative value;

storing, with the processor, the quantization step size representative values generated by the downsampling;

controlling, with the processor, the downsampling based on a predetermined operation parameter including at least one of a downsampling scale factor or information indicating a type of computation when generating the quantization step size representative value;

predicting, with the processor, the quantization step size using the quantization step size representative value; and multiplexing, with the processor, at least the operation parameter in a compression-encoded video bitstream.

8. The method of claim 7, comprising using, as the quantization step size representative value, a quantization step size representative value generated using at least an encoded quantization step size in a current frame.

9. The method of claim 7, comprising using, as the quantization step size representative value, a quantization step size representative value generated using at least an encoded quantization step size in a different frame.

10. The video encoding device according to claim 1, wherein the processor is further configured to execute machine-readable instructions to implement:

a quantization step size upsampling unit configured to retrieve the quantization step size representative value from the quantization step size representative value storing unit, and upsample the quantization step size representative value.

11. The video encoding device according to claim 3, wherein the processor is further configured to execute machine-readable instructions to implement:

a quantization step size upsampling unit configured to retrieve the quantization step size representative value from the quantization step size representative value storing unit, and upsample the quantization step size representative value.

12. The video decoding device according to claim 4, comprising:

a quantization step size upsampling unit configured to retrieve the quantization step size representative value from the quantization step size representative value storing unit, and upsample the quantization step size representative value.

13. The video encoding device according to claim 1, wherein the quantization step size downsampling control unit configured to control the operation of the quantization step size downsampling unit based on the information indicating a type of computation when generating the quantization step size representative value.

14. The video decoding device according to claim 4, wherein the quantization step size downsampling control unit configured to control the operation of the quantization step size downsampling unit based on the information indicating a type of computation when generating the quantization step size representative value.

15. The method of claim 7, wherein the downsampling is controlled based on the information indicating a type of computation when generating the quantization step size representative value.

* * * * *